US005867107A

United States Patent [19]

Gartner

[11] Patent Number: 5,867,107

[45] Date of Patent: Feb. 2, 1999

[54] VARIATION CODED ELECTRO-MECHANICAL LOCK AND METHOD OF USING SAME

[75] Inventor: Klaus W. Gartner, Palos Verdes Estates, Calif.

[73] Assignee: Masco Corporation, Taylor, Mich.

[21] Appl. No.: 868,285

[22] Filed: Jun. 3, 1997

[51] Int. Cl.$^{6}$ .................................................... H04N 11/00

[52] U.S. Cl. ................................ 340/825.31; 340/825.34; 340/543; 340/636; 235/382; 235/382.5; 307/10.4; 307/10.5; 320/148

[58] Field of Search .............................. 340/825.31, 543, 340/636, 825.34; 235/382, 382.5; 307/10.4, 10.5; 320/148; 324/433; 70/278, 63

[56] References Cited

U.S. PATENT DOCUMENTS

| | | | |
|---|---|---|---|
| 3,475,061 | 10/1969 | Steinkamp et al. | 307/130 |
| 3,710,136 | 1/1973 | Contable et al. | 307/109 |
| 4,019,355 | 4/1977 | Germanton | 70/278 |
| 4,148,092 | 4/1979 | Martin | 361/172 |
| 4,220,022 | 9/1980 | Willach | 70/278 |
| 4,457,148 | 7/1984 | Johansson et al. | 70/278 |
| 4,493,001 | 1/1985 | Sheldrake | 361/92 |
| 4,514,731 | 4/1985 | Falck et al. | 340/825.08 |
| 4,633,687 | 1/1987 | Fane | 70/276 |
| 4,665,727 | 5/1987 | Uyeda | 70/279 |
| 4,669,394 | 6/1987 | Fogleman et al. | 109/59 T |
| 4,727,301 | 2/1988 | Fulks et al. | 318/468 |
| 4,736,970 | 4/1988 | McGourty et al. | 292/359 |
| 4,745,784 | 5/1988 | Gartner | 70/277 |
| 4,754,625 | 7/1988 | McGourtney et al. | 70/214 |
| 4,762,212 | 8/1988 | Fish et al. | 192/24 |
| 4,770,012 | 9/1988 | Johansson et al. | 70/278 |
| 4,799,371 | 1/1989 | Duncan | 70/214 |
| 4,831,851 | 5/1989 | Larson | 70/303 |
| 4,838,052 | 6/1989 | Williams et al. | 70/63 |
| 4,887,445 | 12/1989 | Beatty | 70/278 |
| 4,899,562 | 2/1990 | Gartner et al. | 70/277 |
| 4,901,545 | 2/1990 | Bacon et al. | 70/278 |
| 4,904,984 | 2/1990 | Gartner et al. | 340/543 |
| 4,926,664 | 5/1990 | Gartner et al. | 70/119 |
| 4,929,880 | 5/1990 | Henderson et al. | 70/63 |
| 4,956,985 | 9/1990 | Kim | 70/313 |
| 4,967,577 | 11/1990 | Gartner et al. | 70/279 |
| 5,058,404 | 10/1991 | Fish et al. | 70/315 |
| 5,061,923 | 10/1991 | Miller et al. | 340/825.31 |
| 5,134,870 | 8/1992 | Uyeda et al. | 70/277 |
| 5,437,174 | 8/1995 | Aydin | 70/278 |

FOREIGN PATENT DOCUMENTS

| | | |
|---|---|---|
| 4033008 C1 | 12/1991 | Germany . |
| 000217 | 1/1979 | United Kingdom . |

*Primary Examiner*—Brian Zimmerman
*Assistant Examiner*—Yves Dalencourt
*Attorney, Agent, or Firm*—Oppenheimer Wolff & Donnelly LLP

[57] ABSTRACT

A battery powered electro-mechanical lock and method of actuating it under normal battery voltage level condition an access variation arrangement enables the lock to be opened upon the single entry of a correct access code and under low battery voltage levels conditions another access variation arrangements, which prevents the lock from being opened unless the user enters the correct access code N number of times, where N is between 2 and 24.

22 Claims, 5 Drawing Sheets

VARIATION CODED ELECTRO-MECHANICAL LOCK AND METHOD OF USING SAME

TECHNICAL FIELD

The present invention relates in general to an improved electro-mechanical lock and a method of actuating it. The invention more particularly relates to a battery powered variation coded electro-mechanical lock and a method of entering a combination to facilitate battery replacement when the voltage of the battery falls below a predetermined level.

BACKGROUND OF THE INVENTION

There have been many types and kinds of electro-mechanical locks and locking mechanisms used to protect valuables. For example, reference may be made to the following U.S. Pat. Nos.: 3,475,061; 3,710,136; 4,019,355; 4,148,092; 4,457,148; 4,493,001; 4,514,731; 4,762,212; 4,754,625; 4,770,012; 4,831,851; 4,838,052; 4,926,664; and 5,437,174.

As disclosed in the foregoing mentioned patents various lock mechanisms are battery powered and include circuitry for detecting when the power of an associated battery falls below a predetermined level. For example, U.S. Pat. Nos. 4,148,092 discloses an battery powered electronic combination door lock having a voltage detection circuit that causes an alarm to be sounded when the voltage of the battery falls below a predetermined level.

While such electro-mechanical locks may have been satisfactory for some applications, it would be highly desirable to have a new and improved electro-mechanical lock which provides an indication of a low battery voltage condition and which facilitates battery replacement when the battery voltage falls below a predetermined level.

U.S. Pat. No. 4,493,001 disclose a battery rundown protection system wherein the low voltage battery condition is detected before it become so low as to not be suitable for device actuation. In this regard, when the battery voltage falls below a predetermined level, the battery is temporarily disconnected from its load and then subsequently connected to the load when a user attempts to utilize the device.

While such a system provides the user with an indication of a low battery voltage condition and enables the user to gain device access under such low voltage conditions, the disclosed system does not facilitate battery replacement when the battery voltage falls below the predetermined level. In this regard, if the user continues to access the device under such low voltage conditions, the repeated entries would eventually cause the battery to reach a level that would preclude a successful entry.

For example, if an electronic combination door lock, such as disclosed in U.S. Pat. No. 4,148,092 included such a battery rundown protection system, each user of the door lock would become aware of the low voltage condition as he or she accessed the door lock, but such access would not encourage the user to seek replacement of the battery as access is still achieved in the low battery voltage condition. Thus, where an electronic lock has many users seeking access, such repeated use in a low battery voltage condition would eventually cause the battery to reach a level where entry was precluded.

Therefore, it would be highly desirable to have a new and improved battery powered electro-mechanical lock, which can be readily utilized during low battery voltage conditions but which also facilitates battery replacement when the low voltage condition is detected.

BRIEF DESCRIPTION OF THE PRESENT INVENTION

Therefore, the principal object of the present invention is to provide a new and improved battery powered electro-mechanical lock and method of actuating it under low battery voltage conditions, wherein the actuation of the lock under such low voltage conditions facilitates the replacement of the battery.

Briefly, the above and further objects of the present invention are realized by providing a new and improved battery powered electro-mechanical lock which can be readily utilized during low battery voltage conditions according to a novel actuation method of the present invention and that facilitates battery replacement when the low voltage condition is detected.

The battery powered electro-mechanical lock includes an electronically actuated latching mechanism coupled to a microprocessor that responds to a correct access code entered via a keypad. The microprocessor is powered by a battery voltage source coupled to a battery voltage detector that generates an access variation signal when the battery voltage level falls below a predetermined voltage level. The microprocessor responds to the access variation signal and will not respond to the correct access code unless the correct code is entered at least three successive times. The microprocessor further includes a programmable counter that is stepped each time the lock is actuated under such low voltage conditions. The counter causes the number of successive code entries to be incremented N times, where N can be any number between 2 and 24.

Because of the required large number of successive code entries needed for entry and closure the foregoing arrangement is sufficiently annoying to a user to facilitate battery replacement.

BRIEF DESCRIPTION OF DRAWINGS

The above-mentioned and other objects and features of this invention and the manner of attaining them will become apparent, and the invention itself will be best understood by reference to the following description of an embodiment of the invention taken in conjunction with the accompanying drawings, wherein:

FIG. 3 is a simplified flow chart of the steps performed a programmable microprocessor in causing a latching mechanism of FIG. 1 to be actuated between open and close positions.

DETAILED DESCRIPTION OF THE PREFERRED EMBODIMENTS

Figure 1:
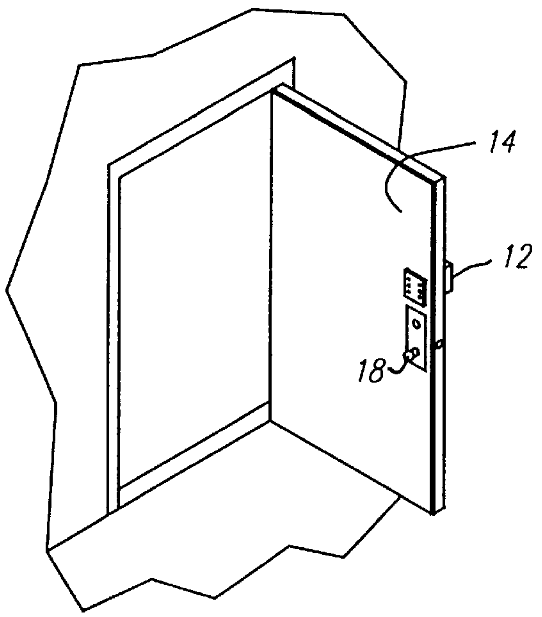
FIG. 1 is a pictorial view of a battery powered electro-mechanical lock which is constructed in accordance with the present invention illustrating the lock affixed to a entrance doorway.
Figure 2:
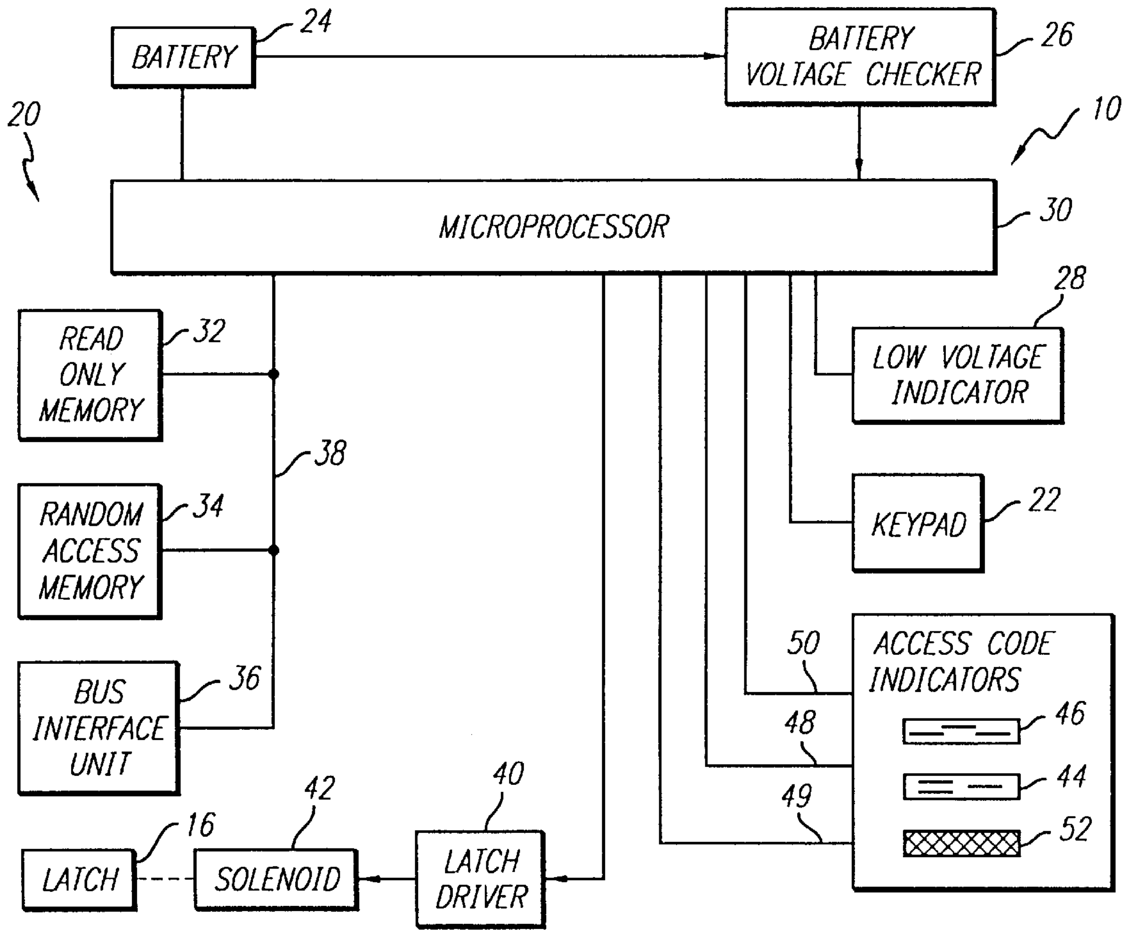
FIG. 2 is a diagrammatic block diagram of the battery powered electro-mechanical lock of FIG. 1.

Referring now to the drawings, and more particularly to FIGS. 1 and 2 thereof, there is shown a battery powered electro-mechanical lock 10, which is constructed in accordance with the present invention. The lock 10 can be readily accessed under low battery voltage conditions in accordance with the method of the present invention.

The battery powered lock 10 generally comprises a housing 12 which is adapted to mounted to the outside of a door

14 by means not shown. An electronic logic circuit 20 powered by a battery 24, is mounted within the housing 12 and is responsive to a coded input signal entered via a keypad 22 mounted to the housing 12. In this regard, the logic circuit 20 causes a solenoid plunger or latch 16 mounted within the door 14 to move between close and open positions when the coded input signal is received via a user (not shown) entering a correct combination from the keypad 22.

As best seen in FIG. 1, the door 14 includes a door knob 18, which may be grasped and turned for opening the door 14, when the plunger 16 is retracted into an open position. As will be explained hereinafter in greater detail, when the plunger 16 is actuated to its open position, the plunger 16 remains retracted for a sufficient period of time to permit the user to open the door 14 but not a sufficient period of time to permit the user to lock the door 14 once it has been opened. In this regard, the user must re-enter the correct access code to enable the door 14 to be once again locked in a closed position.

In order to facilitate the replacement of the battery 24 under low battery voltage conditions, the lock 10 also includes a voltage or power detection circuit 26, which is coupled between the logic circuit 20 and the battery 24. The circuit 26 generates a low battery voltage signal whenever the current output from the battery 24 falls below a certain predetermined level.

As will be explained hereinafter, the logic circuit 20 responds to the low battery voltage signal and causes an light emitting diode 28 mounted to the housing 12 to be illuminated to give a visual indication that the battery 24 is in a low voltage condition.

The logic circuit 20 further responds to the low battery signal by causing an access variation program 100 (FIG. 3) to be executed that causes a variation to be made to the manner of inputting the combination code from the keypad 22 in order for a user to gain access for opening the door 14. More particularly, in order for the user to gain access, the user must enter the correct combination code at least two successive times. In this regard, when the correct access code has been entered by the user the required N number of times, the plunger 16 is retracted for a sufficient redetermined period of time to allow the user to open the door 14 for access purposes.

As mentioned earlier, the period of time the plunger 16 remains retracted is not a sufficient period of time to permit the user to close the door 14. In the regard, after the predetermined period of time has elapsed, the plunger 16 moves to the closed position preventing the door 14 from being closed in a locked position. Thus, in order for the user to lock the door 14, the user must enter the correct combination code another N number of times. The plunger 16 will then retract, permitting the user to close the door 14 in the lock position.

While the preferred embodiment of the present invention requires the user to re-enter the access code to enable the plunger 16 to be retracted a second time to facilitate the re-locking of the door 14, it is contemplated within the true spirit and scope of the present invention that the first mentioned predetermined period of time can be an adjustable period of time so that opening and closing of the door 14 can be accomplished by entering the access code but a single time under a normal mode of operation and only twice under a low voltage mode of operation.

It is also contemplated within the true spirit and scope of the present invention that the plunger 16 can be in a normally open position. In this regard, the operation to cause the plunger 16 to be extended for locking the door 14 would be accomplished in substantially the same manner as described above for causing the plunger 16 to be retracted for unlocking the door 14.

Considering now the logic circuit 20 in greater detail with reference to FIG. 1, the logic circuit 20 generally comprises a microprocessor 30 having a read only memory (ROM) unit 32 and a random access memory (RAM) unit 34. The ROM unit 32 has at least one combination or authorized access code stored therein which must be retrieved for comparison purposes with another access code entered by the user via the keypad 22.

The RAM unit 34 is coupled between the microprocessor 30 and an external interface unit 36 via a common data bus 38. In this regard, the interface unit 36 can be accessed for downloading the access variation program 100 into the RAM unit 34.

In order to enable the microprocessor 30 to control the operation of the plunger 16, the lock 10 also includes a transistor type solenoid driver circuit 40 which is coupled between the microprocessor 30 and a solenoid 42. The solenoid 42 causes the plunger 16 to move between open and close positions whenever the microprocessor 30 sends an actuation signal to the driver 40. The operation of the solenoid drive 40 and solenoid 42 are well know to those skilled in the art and such operation will not be described in greater detail.

In the preferred embodiment of the present invention, the driver 40 is a solenoid driver. It is contemplated that other types and kinds of driver, such as a motor driver may be employed.

As best seen in FIG. 1, the lock 10 further includes an pair of code entry indicators 44 and 46 respectively. The code entry indicator 44 is a light emitting diode for emitting light in the green color spectrum. The code entry indicator 46 is a light emitting diode for emitting light in the red color spectrum.

From the foregoing those skilled in the art will understand that whenever a user enters a correct access code, the microprocessor 30 will generate a pulsed correct indication signal on a conductor path 48 that causes the code entry indicator 44 to be illuminated for a short period of time as determined by the duration of the pulsed correct indication signal. In a similar manner, whenever the user enters an incorrect access code via the keypad 22, the microprocessor 30 will generate a pulsed incorrect indication signal on a conductor path 50 that causes the code entry indicator 46 to be illuminated for another short period of time as determined by the duration of the pulsed incorrect indication signal.

In the preferred embodiment of the present invention the pulsed correct and pulsed incorrect signals have a fixed duration. However, it is contemplated within the true scope and spirit of the present invention that the duration of either one or both of the signals may be adjusted to longer or shorter periods of time to accommodate for differences in user visual perceptibility.

In order to facilitate alerting the user to a low battery condition, the lock 10 also includes a speaker unit 52 which is mounted adjacent to the code entry indicators 44 and 46 respectively. The speaker unit 52 responds to a secondary pulsed correct indication signal on the conductor path 49 and provides an audible sound to alert the user whenever he or she enters a correct access code during a low battery voltage condition only. In this manner, the user will understand the lock 10 is operating in a variation access mode of operation and that battery replacement is required.

In operation under the normal mode of operation the user enters a correct access code via the key pad 22. The microprocessor 30 responds to the correct code by sending a signal to the latch driver 40 which in turn causes the solenoid 42 to move the latch 16 to an open position. The microprocessor 30 also responds to the correct access code by sending a signal to the access code indicator 44 which is illuminated for a short period of time to indicate to the user that he or she has entered a correct combination code.

In a low voltage mode of operation, the battery voltage checker 26 generates a low battery voltage signal. The microprocessor 30 responds to the low voltage condition by causing the low voltage indicator 28 to be pulsed to an on condition for a short period of time when the user attempts to seek access through the lock. As the voltage indicator 28 is in close proximity to the keypad 22, the illumination of indicator 28 is a first indication to the user that a low battery voltage now exists.

The microprocessor 32 further responds to the low voltage condition by calling its low voltage mode of operation to change the access code variation needed to obtain entrance. In this regard, during a first attempt to seek access under a low condition, the user must enter the correct access code twice before the plunder 16 will be moved between positions. During a second attempt to seek access under a low voltage condition, the user must enter the correct access code three times. The number of times the access code must be correctly entered is increased thereafter. Table I illustrates the number of times the access code must be entered by a level count stored in the COUNTER #1 column.

Each time the user enters a correct access code, the microprocessor 30 sends a short pulse signal to the speaker 52 to provide the user with an indication that he or she entered a correct code. Neither the indicator 44, nor the latch 16 are activated however until the user has entered the correct code the required number of times.

Considering now the access variation program 100 in greater detail with reference to FIG. 3, the access variation program 100 has a normal voltage mode of operation 300 and a low voltage mode of operation 400. Each of the operational modes 300 and 400 will be described hereinafter in greater detail.

Considering now the access variation program 100, whenever the lock 10 is initialized the access variation program begins at a start command 101. The microprocessor 30 than proceeds to an initialization step 102 which causes two internal counters, COUNTER #1 and COUNTER #2 and two internal flags, FLAG #1 and FLAG #2 to be reset. As will be explained herein, COUNTER #1 is decremented once each time the user enters a correct access code under low battery voltage conditions, while COUNTER #2 is incremented once each time a user successfully completes an access variation under low battery voltage conditions. FLAG #1 and FLAG #2 are utilized for controlling both opening and closing the lock 10.

In the preferred embodiment of the present invention there are four access variation levels. In level 0 when both COUNTER #1 and COUNTER #2 are reset the battery voltage of the battery 24 is above the predetermined low voltage level. In this regard, neither one of the counters values will be changed when a user successfully enters the correct access code.

In level 1, COUNTER #1 is initially set to an initial count N. In one embodiment the count N is 2 and in another embodiment the count N is 3. As both initial counts cause similarly repetitive operations, only the count 3 will be described in greater detail.

COUNTER #1 is set to a count of three and is then decremented each time the user successfully enters a correct access code. In this regard, when the user successfully enters the access code three times, COUNTER #2 will be incremented to a count of 1 and the plunger 16 will be retracted providing access to the user. When COUNTER #2 is incremented an internal timer starts and times out in a predetermined period of time $t_1$. When the internal timer times out, the plunger 16 extends to its closed position thus, preventing the door 14 from being locked. The user must then enter the correct access code three additional times in order to cause COUNTER #1 to be decremented to zero so the plunger 16 is once again retracted for another predetermined period of time $t_2$. In this regard, COUNTER #1 will be set to a first level of three when the user attempts to enter the access code to activate the plunger 16 again.

The predetermined period of times $t_1$ and $t_2$ are programmably adjustable. However in the preferred embodiment of the present invention, each of the predetermined periods of time are between about 2 seconds and about 30 seconds. A more preferred time period is between about 4 seconds and about 20 seconds, while the most preferred period of time is about 10 seconds.

From the foregoing, it should be understood by those skilled in the art that when the time periods $t_1$ and $t_2$ are adjusted to a long time duration, the user may enter the doorway allowing the door 14 to be closed in a locked position.

The operations at level 2 and level 3 are substantially similar to level 1 except COUNTER #1 is initially set to a count of six in level 2 operations and a count of twelve in level 3 operations. To distinguish level 1, level 2 and level 3 operations from one another, COUNTER #2 is incremented by a count of one. Table I provides a quick overview of the values set in COUNTERS #1, and #2 during the access variation program 100.

TABLE I

| LEVEL NO. | COUNTER NO. 1 | COUNTER NO. 2 |
|---|---|---|
| #0 | 0 | 0 |
| #1 | 3 | 1 |
| #2 | 6 | 2 |
| #3 | 12 | 3 |

Considering again now the access variation program 100 in greater detail with reference to FIG. 3, the microprocessor 30 advances from step 102 to a determination step 104, which determines whether the voltage level of the battery 24 has fallen below a first predetermined low level. In this regard, if the power detection circuit 26 has generated a low voltage signal, the microprocessor 30 proceeds to a CALL command 106 and calls a subroutine LOW VOLTAGE MODE 400 that will be described hereinafter in greater detail.

If the power detection circuit 26 has not generated a low voltage signal, the microprocessor 30 proceeds to another CALL command 108, and calls a subroutine NORMAL MODE 300 that will be described hereinafter in greater detail.

After the determined one of the subroutines 200 or 300 has been executed, the executed subroutine returns to the determination step 104 to once again allow the access variation program 100 to check for a low battery voltage condition.

Figures 1, 3A:
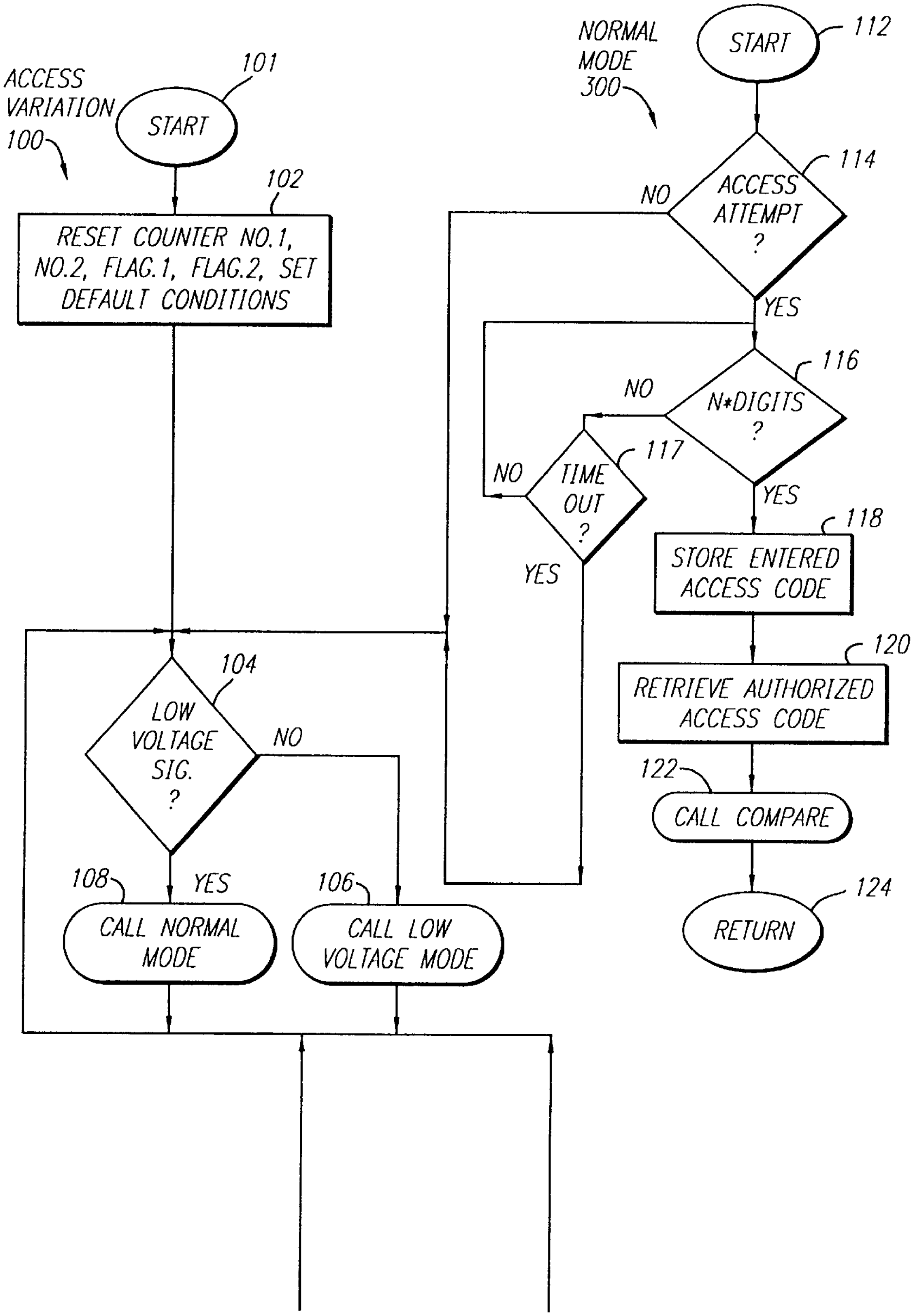
Figures 2, 3A:
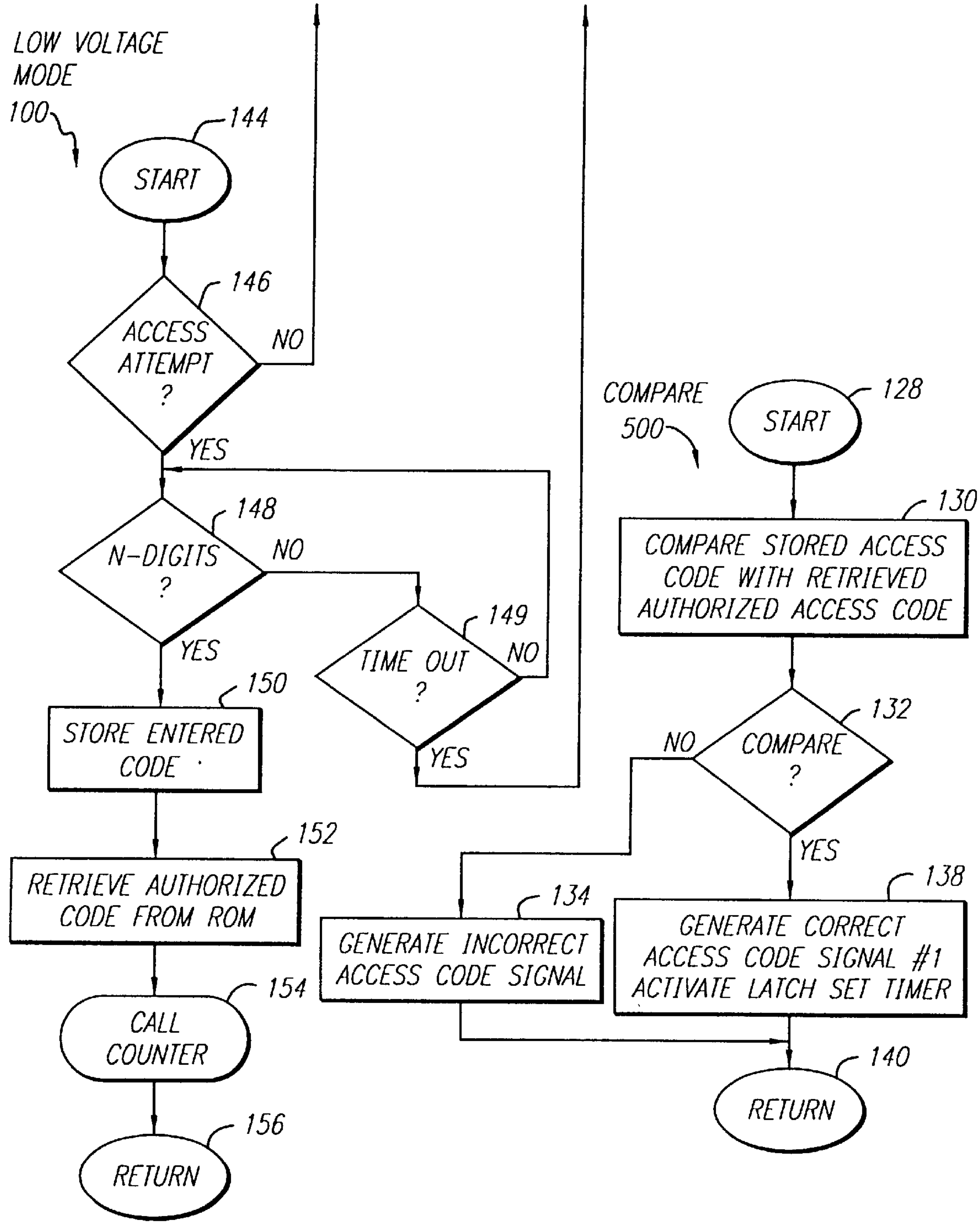

Considering now the NORMAL MODE 300 in greater detail with reference to FIG. 3A, the NORMAL MODE 300 commences at a START command 112 which is initiated when the CALL command 108 is executed. From the START command 112, the microprocessor 30 steps to a DETERMINATION command 114, which determines whether a user has attempted to enter an access code. In this regard, if the user has not activated at least one of the code entry keys on the keypad 22, the program will return to the access variation program step 104 and proceed as previously described.

If the user has attempted to enter an access code, the microprocessor 30 steps to another DETERMINATION step 116, which determines whether the user has entered an N-digit access code. The number of digits in an authorized access code is programmable. In this regard, the number of N-digits is between 1 and 20. A more preferred number of N-digits is between 5 and 10, while the most preferred number of N-digits is 9.

If the user has entered an N-digit access code, the microprocessor 30 advances to a STORE command 118 that will be described hereinafter. If the user has not enter an N-digit access code, the microprocessor 30 starts an internal timer having a predetermined time out period of about $t_3$ seconds, and proceeds to a DETERMINATION step 117, which determines whether the internal timer has elapsed. In this regard, $t_3$ time is between about 5 seconds and about 30 seconds. A more preferred $t_3$ time is between about 10 seconds and about 25 seconds, while a most preferred time is about 15 seconds.

If the timer has elapsed, the firmware will return to the access variation program step 104 and proceed as previously described.

If the timer has not elapsed, the microprocessor 30 returns to the determination step 116 and proceeds as previously described. In this regard, at the STORE step 118, the microprocessor 30 causes the N-digit access code entered by the user to be temporarily stored in an internal buffer register as well as in the random access memory 34. In this regard, the program stores in the memory unit 34, the entered access code, a user number, as well as the date and time the code was entered. In this manner a record of all access entries can be retrieved for record keeping purposes.

The microprocessor 30 then advances to another COMMAND step 120 and causes an authorized access code stored in the read only memory unit 32 to be retrieved and temporarily stored in another internal buffer register. The microprocessor 30 than proceeds to a CALL command 122 which causes a subroutine COMPARE 500 (FIG. 3A) to be called. After the subroutine COMPARE 500 has been executed, the program returns to the access variation program step 104 via a RETURN command 124 and proceeds as previously described.

Considering now the subroutine COMPARE 500 in greater detail, the subroutine COMPARE 500 begins at a START command 128 and advances to a COMPARE command 130, which causes the access number entered and temporarily stored to be compared with the retrieved and temporarily stored authorized access number. The microprocessor 30 then goes to a DETERMINATION step 132, which verifies whether the entered access code compared with the retrieved authorized code.

If there was a determined comparison, the microprocessor 30 proceed to a COMMAND instruction 138, which causes the plunger 16 to be activated and an access code verification or correct access code signal to be generated, which it turn causes the LED indicator 44 to be illuminated. The access code verification signal is a pulsed signal having a duration of about $t_4$ seconds. The time period $t_4$ is a programmably adjustable period between about 2 seconds and about 30 seconds. A more preferred time period is between about 4 seconds and about 20 seconds, while the most preferred time is about 10 seconds. In this regard, the time the LED indicator 44 is illuminated is about the same time period that the plunger 16 remains in a retracted state.

At the end of the verification signal time period, the microprocessor 30 proceeds to a RETURN command 140 which causes the firmware to return to the access variation program step 104.

At DETERMINATION step 132, if a determination is made that the entered access code and the authorized access code did not compare with one another, the microprocessor 30 advances to another COMMAND step 134, which causes an incorrect access code signal to be generated, which in turn, causes the LED indicator 46 to be illuminated. The incorrect access code signal is a pulsed signal having a duration of about $t_5$ seconds. The time period $t_5$ is a programmably adjustable period between about 1 second and about 10 seconds. A more preferred time period is between about 2 seconds and about 8 seconds, while the most preferred time is about 5 seconds.

At the end of the duration of the incorrect access code signal, the microprocessor 30 proceeds to the RETURN command 140, which causes the program to return to the access variation program step 104 and to proceed as previously described.

Considering now the LOW VOLTAGE MODE 400 in greater detail, the LOW VOLTAGE MODE 400 begins at a START command 144 which commences in responds to the CALL command 106 as previously described. Next the microprocessor 30 advances to a DETERMINATION step 146, which determines whether the user has attempted to enter an access code. If the user has not attempted to enter an access code, the microprocessor 30 returns to the access variation program step 104.

If the user has attempted to enter an access code, the microprocessor 30 proceeds to another DETERMINATION step 148, which determines whether the user has entered an N-digit access code.

If the user has not entered an N-digit access code, the microprocessor 30 starts an internal timer and then advances to a time out step 149 to determine whether the internal timer has elapsed.

If the internal timer has not elapsed the microprocessor 30 returns to the DETERMINATION step 148 and proceeds as previously described. If the internal timer has elapsed, the microprocessor 30 returns to the access variation program step 104 and proceeds as previously described.

At DETERMINATION step 148, the microprocessor 30 goes to a COMMAND step 150 if there is a determination that the user entered an N-digit access code. The COMMAND step 150 causes the entered access code to be temporarily stored.

As the entered access code is stored in the memory unit 34, a record can be retrieved from the memory unit 34 that is indicative of the number of times the correct access code was entered under a low battery voltage condition. In this regard, if the access code is prefaced with a user identification code, it is possible to identify users who fail to report a low battery voltage condition. In this manner, a user who fails to promptly report a low voltage condition may received instruction on the importance of replacing the battery 24 to facilitate better battery maintenance.

The microprocessor 30 then goes to a COMMAND step 152, which causes the authorized access code stored in the read only memory unit 32 to be retrieved and temporarily stored. Next a CALL instruction 154 is executed which causes a subroutine COUNTER 600 to be executed. Once the subroutine COUNTER 600 is executed the microprocessor 30 proceeds to a RETURN command 156 which advances to the access variation program step 104.

Figures 1, 3B:
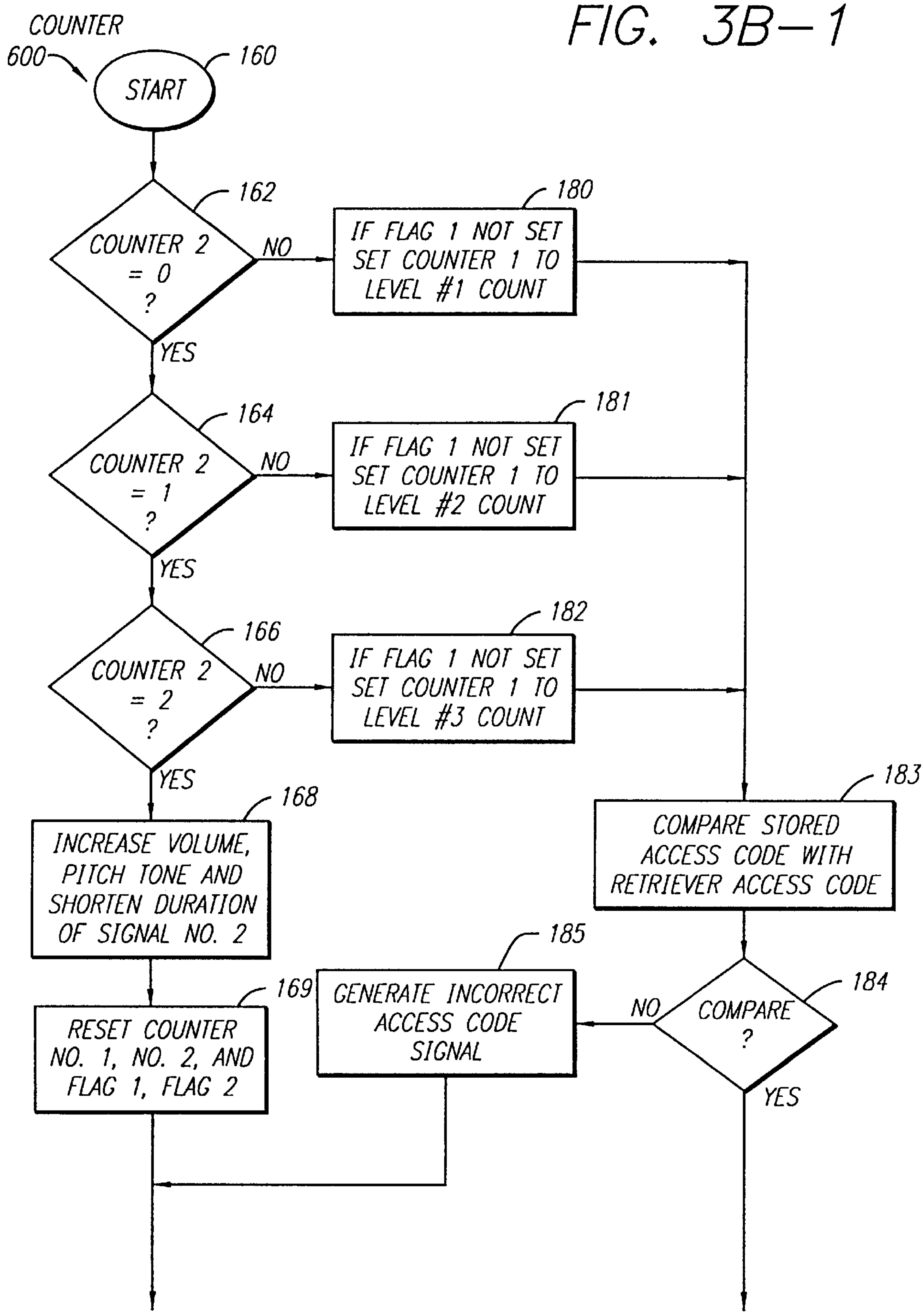
Figures 2, 3B:
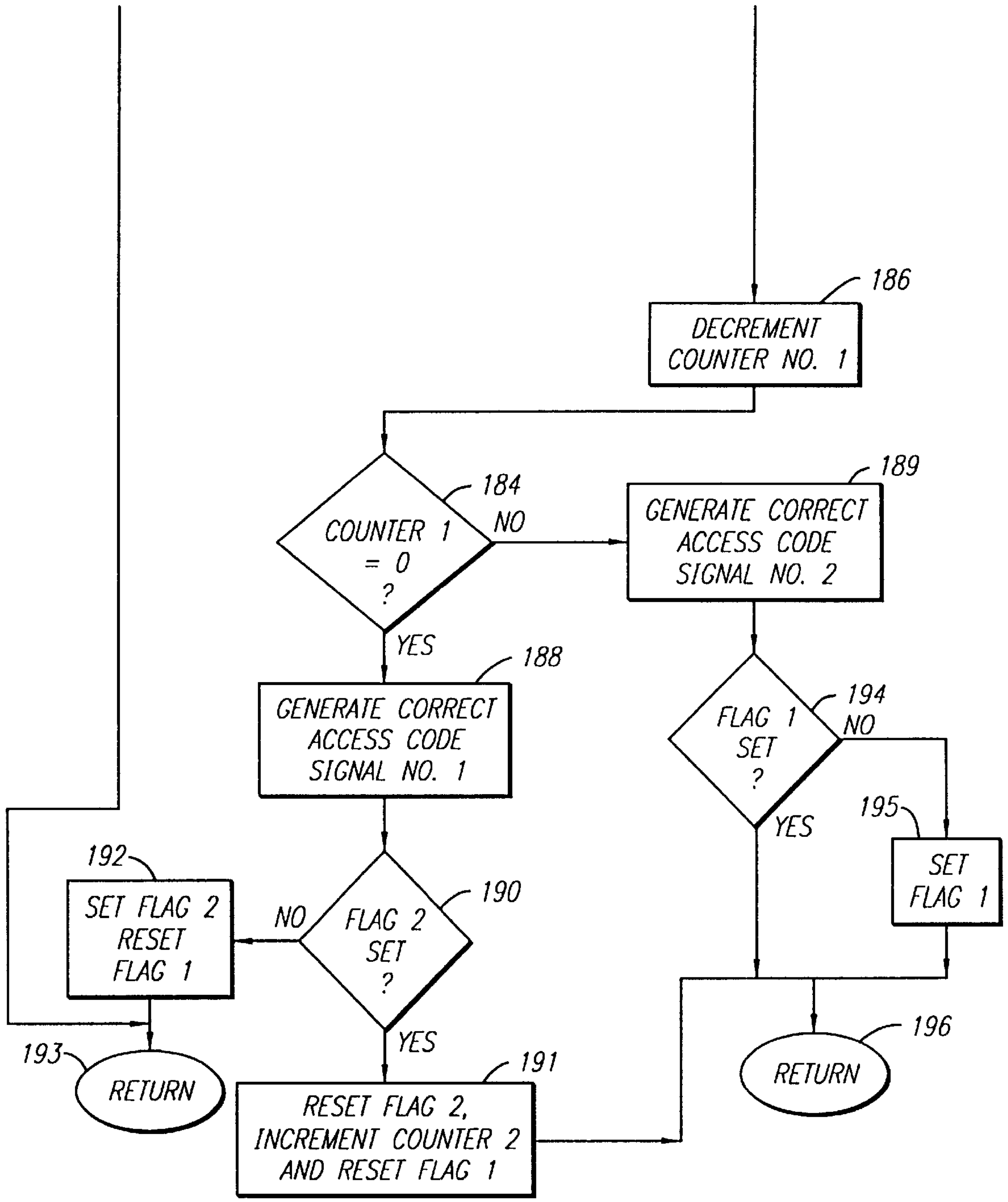

Considering now the subroutine COUNTER 600 in greater detail with reference to FIG. 3B, the subroutine COUNTER 600 begins at a START command 160 and proceeds to a DETERMINATION step 162, which determines whether COUNTER 2 is set to a zero value. As COUNTER 2 was reset to a zero value at step 102, the microprocessor 30 goes to a COMMAND step 180 that will be described hereinafter.

If the COUNTER 2 is not equal a zero value the microprocessor 30 proceeds to a DETERMINATION step 164, which determines whether the COUNTER 2 is equal to a value of one. If COUNTER 2 is equal to a value of one the microprocessor advances to a COMMAND step 181 that will be described hereinafter.

At step 164 the microprocessor advances to a DETERMINATION step 166 if COUNTER 2 is not equal to a value of one. The step 166 determines whether the COUNTER 2 is equal to a value of two. In this regard, if the COUNTER is set to a value of two, the microprocessor 30 goes to a COMMAND instruction 182 that will be described hereinafter.

Should a determination be made that the COUNTER 2 is not set to a value of two at step 166, the microprocessor 30 advances to a COMMAND step 168 which causes the volume and tone pitch produced by the speaker 52 to be increased and the duration of the correct access signal on conductor 48 to be decreased. The purpose of this step is to cause the audible sound that alerts the user to a low battery voltage condition to be emphasized so the user will immediately replace the battery 24 before it fails.

The microprocessor 30 then goes to a COMMAND instruction 169 that causes the internal counters and flags of the microprocessor 30 to be reset to there initialized conditions. The microprocessor then proceeds to a RETURN step 193 that advances the program to the access variation program step 104 as described previously.

Considering now the COMMAND steps 180–182, each of these steps performs substantially the same function by setting an internal counter of the microprocessor 30 (COUNTER #1) to a level count of 3, 6, and 12 respectively if FLAG #1 is not set. In this regard, since FLAG #1 was initially reset at step 102, a correct count value should be loaded into COUNTER #1.

The level count can be programmably changed to any value N. In this regard N can be any value between 2 and 24. Thus, the level counts of 3, 6, and 12 are illustrative.

Each of the steps 180–182 once executed result in the microprocessor 30 advancing to a COMMAND step 183, which caused the microprocessor 30 to execute a compare command by comparing the value of the access code entered by the user with the authorized access code retrieved from the read only memory 32.

Next a DETERMINATION step 184 is executed to determine whether the two codes compared with one another. In this regard, if there was a not a comparison, the microprocessor 30 proceeds to a COMMAND instruction 185 which causes an incorrect access code signal to be generated, which in turn causes the LED indicator 46 to be illuminated for a short period of time.

If there is a comparison between the two codes at step 184, the microprocessor 30 advances to a COMMAND step 186, which causes the COUNTER 1 to be decremented by one count. The microprocessor 30 then goes to a DETERMINATION step 187, which determines whether COUNTER 1 has been decremented to a zero value.

Should COUNTER 1 not be at a zero value, the microprocessor advances from step 187 to a COMMAND step 189. which generates a correct access code signal 2, which in turn causes the speaker 52 to emit an audible sound. In this manner, the user is informed of three conditions:

1. The audible sound informs the user that the battery 24 is in a low voltage condition;
2. The audible sound informs the user that he or she has entered the correct access code but that the code must be entered repeatedly thereafter for a fixed predetermined number of times before the user may gain access through the door 14; and
3. The audible sound informs the user that he or she must re-enter the correct access code the same number of time that enables access in order to be able to enter the premises and then close the door 14 in a closed locked position.

As the number of times the user may have to enter the correct access code can be between 2 times and 24 times, the user under his or her own initiative is encourage to seek to have the battery 24 replaced as soon as possible.

Next the microprocessor 30 advances to a DETERMINATION step 194, which determines whether FLAG #1 has been set. FLAG #1 was reset at step 102, therefore the determination is that the FLAG #1 is not set. This condition of FLAG #1 not being set enables the COUNTER #1 to be set again to a same LEVEL COUNT at one of the steps 180–182 as previously described.

As the FLAG #1 was not set at step 194, the microprocessor 30 goes to a COMMAND step 195, which sets FLAG #1. The microprocessor 30 then proceeds to a RETURN step 196 which advances to the step 104 as described previously.

Setting FLAG #1 prevents COUNTER #1 from being set to a LEVEL COUNT at one of the steps 180–182. In this regard, COUNTER #1 as will be described in greater detail, COUNTER #1 will be decremented by a single count each time the user enters a correct access code until COUNTER #1 reaches a zero value. Thus, when COUNTER #1 reaches a zero value, the microprocessor 30 advances from the determination step 187 to a COMMAND step 188, which generates the correct access code signal 1, resets FLAG #1, and sets the internal timer for activating the plunder 16. When the timer elapses, the microprocessor proceeds to the next step.

At time out, the microprocessor 30 then steps to a DETERMINATION step 190, which determines whether FLAG #2 was set. FLAG #2, like FLAG #1 was initially reset at step 102. Accordingly, the microprocessor 30 processed to a COMMAND step 192, which cause FLAG #2 to be set and FLAG #1 to be reset. The setting of FLAG #2 is a counter step that prevents COUNTER #2 from being incremented until the user enters the correct access code for another predetermined number of times as required by the LEVEL of operation as more fully set forth in TABLE I.

At step 190 if a determination is made that FLAG 2 is set, the microprocessor 30 goes to a COMMAND instruction 191 which causes FLAG #1 and FLAG #2 to be reset and COUNTER #2 to be incremented.

After step 191 have been executed, the microprocessor 30 advances to the RETURN command 196 and proceeds as described previously.

From the foregoing it should be understood by those skilled in the art, that the microprocessor 30 executes the COUNTER program steps in such a manner to cause the user the inconvenience of having to enter a correct access code a sufficiently large number of times to encourage the user to seek the replacement of the battery 12.

Having thus described a preferred exemplary embodiment of an electro-mechanical combination door lock in accordance with the present invention, it should now be apparent to those skilled in the art that the aforestated objects and advantages for the within lock have been achieved, It should also be appreciated by those skilled in the art, that various modifications, adaptations and alternatives embodiments thereof may be made within the scope and spirit of the present invention. For example, the number of times a user must enter a correct access code can be any programmable number. Thus, there is no intention, of limitations to the exact abstract or disclosure herein presented.

I claim:

1. A battery powered electro-mechanical lock having a lock mechanism movable between open and close positions for securing an access entrance, comprising:

a driver circuit responsive to a lock actuation signal for causing the locking mechanism to be moved mechanically between the open and close positions;

a microprocessor coupled electrically to said driver circuit for generating said lock actuation signal in response to a correct access code;

a keypad coupled electrically to said microprocessor for enabling a user to enter an access code and said access code being received by said microprocessor for comparison purposes to determine whether the user entered access code is said correct access code;

a power detection circuit coupled electrically to said microprocessor for generating a power signal indicative for a battery voltage level condition;

an access variation algorithm responsive to said power signal for enabling the microprocessor to generate said lock actuation signal in response to the user entering the correct access code a single time only, when said power signal is indicative of a normal battery voltage level condition; and another access variation algorithm responsive to said power signal for enabling the microprocessor to generate said lock actuation signal in response to the user entering the correct access code at least N times when said power signal is indicative of a low battery voltage level condition;

said N times being greater than a single time.

2. A battery powered electro-mechanical lock according to claim 1, wherein said driver circuit is a transistor driver circuit.

3. A battery powered electro-mechanical lock according to claim 1, further comprising:

a read only memory unit coupled to said microprocessor for storing at least one authorized access code;

a random access memory unit coupled to said microprocessor for storing temporarily a user entered access code; and an interface unit coupled to said read only memory unit, said random access memory unit, and said microprocessor for facilitating the storage of an access variation program in said random access memory to enable the microprocessor to execute said access variation algorithm and said another access variation algorithm.

4. A battery powered electro-mechanical lock according to claim 1, further comprising:

an interface bus for coupling said read only memory unit, said random access memory unit, and said interface unit to said microprocessor.

5. A battery powered electro-mechanical lock according to claim 1, wherein N is equal to 3.

6. A battery powered electro-mechanical lock according to claim 1, wherein N is equal to 6.

7. A battery powered electro-mechanical lock according to claim 1, wherein N is equal to 12.

8. A battery powered electro-mechanical lock according to claim 1, further comprising a correct access code indictor to provide the user with an indication that he or she entered a correct access code.

9. A battery powered electro-mechanical lock according to claim 8, wherein said correct access code indicator is a visual indicator.

10. A battery powered electro-mechanical lock according to claim 9, wherein said visual indicator is a light emitting diode.

11. A battery powered electro-mechanical lock according to claim 10, wherein said light emitting diode emits light having a wavelength in a green color spectrum.

12. A battery powered electro-mechanical lock according to claim 8, wherein said correct access code indicator is an audible indictor.

13. A battery powered electro-mechanical lock according to claim 12, wherein said audible indicator is a sound of a predetermined duration, emitted by a speaker.

14. A battery powered electro-mechanical lock according to claim 11, further comprising another correct access code indicator to provide the user with an indication that he or she must enter the correct access code at least (N-1) additional times because of a low battery voltage level condition.

15. A battery powered electro-mechanical lock according to claim 14, wherein said another correct access code indicator is an audible indicator.

16. A battery powered electro-mechanical lock according to claim 15, wherein said audible indicator is a sound of a predetermined duration.

17. A battery powered electro-mechanical lock according to claim 16, wherein said audible indicator is a sound of predetermined volume and pitch.

18. A battery powered electro-mechanical lock according to claim 17, wherein said predetermine duration, volume and pitch are each adjustable to provide indications of different levels of low battery voltage conditions.

19. A battery powered electro-mechanical lock according to claim 18, wherein critical low battery voltage condition is indicated by a sound of a short duration, with a high volume and pitch.

20. A method of providing a user of a battery powered microprocessor controlled electro-mechanical lock with an incentive to replace the lock battery when its voltage output falls below a predetermined level, comprising:

actuating a driver circuit in response to a lock actuation signal to cause a locking mechanism to move between open and close positions;

determining a battery voltage level condition of the lock battery;

generating said lock actuation signal in response to the user entering a correct access code a single time only, when said battery voltage level condition is indicative of a voltage level at least equal to the predetermined level; and generating said lock actuation signal in response to the user entering said correct access code at least twice when said battery voltage level condition is indicative of a voltage level below the predetermined level.

21. A battery powered, microprocessor controlled lock responsive to a correct access code, comprising:

an access variation arrangement responsive to a normal battery voltage level condition for enabling the microprocessor to generate a lock actuation signal in response to the correct access code being received by the microprocessor a single time only; and another access variation arrangement responsive to a low battery voltage level condition for enabling the microprocessor to generate said lock actuation signal in response to the correct access code being received by the microprocessor at least twice.

22. A battery powered, microprocessor controlled lock according to claim 21 further comprising:

a locking mechanism movable between open and close position; and said lock actuation signal causing said locking mechanism to be moved between open and close positions.

* * * * *